(12) United States Patent
Dong et al.

(10) Patent No.: US 7,589,511 B2
(45) Date of Patent: Sep. 15, 2009

(54) DC-DC VOLTAGE CONVERTER

(75) Inventors: Wei Dong, Cary, NC (US); John Kleine, Cary, NC (US); Kun Xing, Cary, NC (US)

(73) Assignee: Intersil Americas Inc., Milpitas, CA (US)

( * ) Notice: Subject to any disclaimer, the term of this patent is extended or adjusted under 35 U.S.C. 154(b) by 0 days.

(21) Appl. No.: 12/041,458

(22) Filed: Mar. 3, 2008

(65) Prior Publication Data

US 2008/0203985 A1 Aug. 28, 2008

Related U.S. Application Data (63) Continuation of application No. 11/426,365, filed on Jun. 26, 2006, now Pat. No. 7,339,361.

(51) Int. Cl.
*G05F 1/40* (2006.01)
*G05F 1/56* (2006.01)
*G05F 1/613* (2006.01)

(52) U.S. Cl. .................. 323/285; 323/225; 323/271

(58) Field of Classification Search ............ 323/222, 323/223, 225, 265, 268, 271, 272, 282, 283, 323/285; 363/65, 71
See application file for complete search history.

(56) References Cited

U.S. PATENT DOCUMENTS

| | | | | |
|---|---|---|---|---|
| 5,973,485 A * | 10/1999 | Kates et al. | ................. | 323/272 |
| 6,362,608 B1 | 3/2002 | Ashburn et al. | | |
| 6,600,296 B2 | 7/2003 | Hazucha | | |
| 6,696,882 B1 * | 2/2004 | Markowski et al. | ......... | 327/531 |
| 6,826,028 B2 | 11/2004 | Schuellein | | |
| 7,005,835 B2 * | 2/2006 | Brooks et al. | ............... | 323/282 |
| 7,071,662 B2 * | 7/2006 | Hsu et al. | ................... | 323/272 |
| 7,106,035 B2 | 9/2006 | Xing | | |
| 2007/0063679 A1 | 3/2007 | Weng et al. | | |

* cited by examiner

*Primary Examiner*—Matthew V Nguyen
(74) *Attorney, Agent, or Firm*—Fogg & Powers LLC (57) ABSTRACT

A DC-DC voltage converter is provided that includes a plurality of power channels and a controller. Each power channel is configured to provide a voltage output to an output node of the converter. Each power channel also includes a first sensing circuit configured to provide a primary feedback signal indicative of an output current of the power channel. Each power channel further includes an auxiliary sensing circuit to provided one or more auxiliary feedback signals indicative of an output current of each of the respective other power channels. The controller is configured to control each of the power channels based at least in part on the primary feedback signal and the one or more auxiliary feedback signals.

7 Claims, 6 Drawing Sheets

DC-DC VOLTAGE CONVERTER

RELATED CASES

The present application claims priority to and is a continuation application of U.S. application Ser. No. 11/426,365 entitled "Multi-Phase Dc-Dc Converter Using Auxiliary Resistor Network To Feed Back Multiple Single-Ended Sensed Currents To Supervisory Controller For Balanced Current-Sharing Among Plural Channels," filed on Jun. 26, 2006, which is now a U.S. Pat. No. 7,339,361, which is herein incorporated by reference in its entirety.

BACKGROUND OF THE INVENTION

Figure 1:
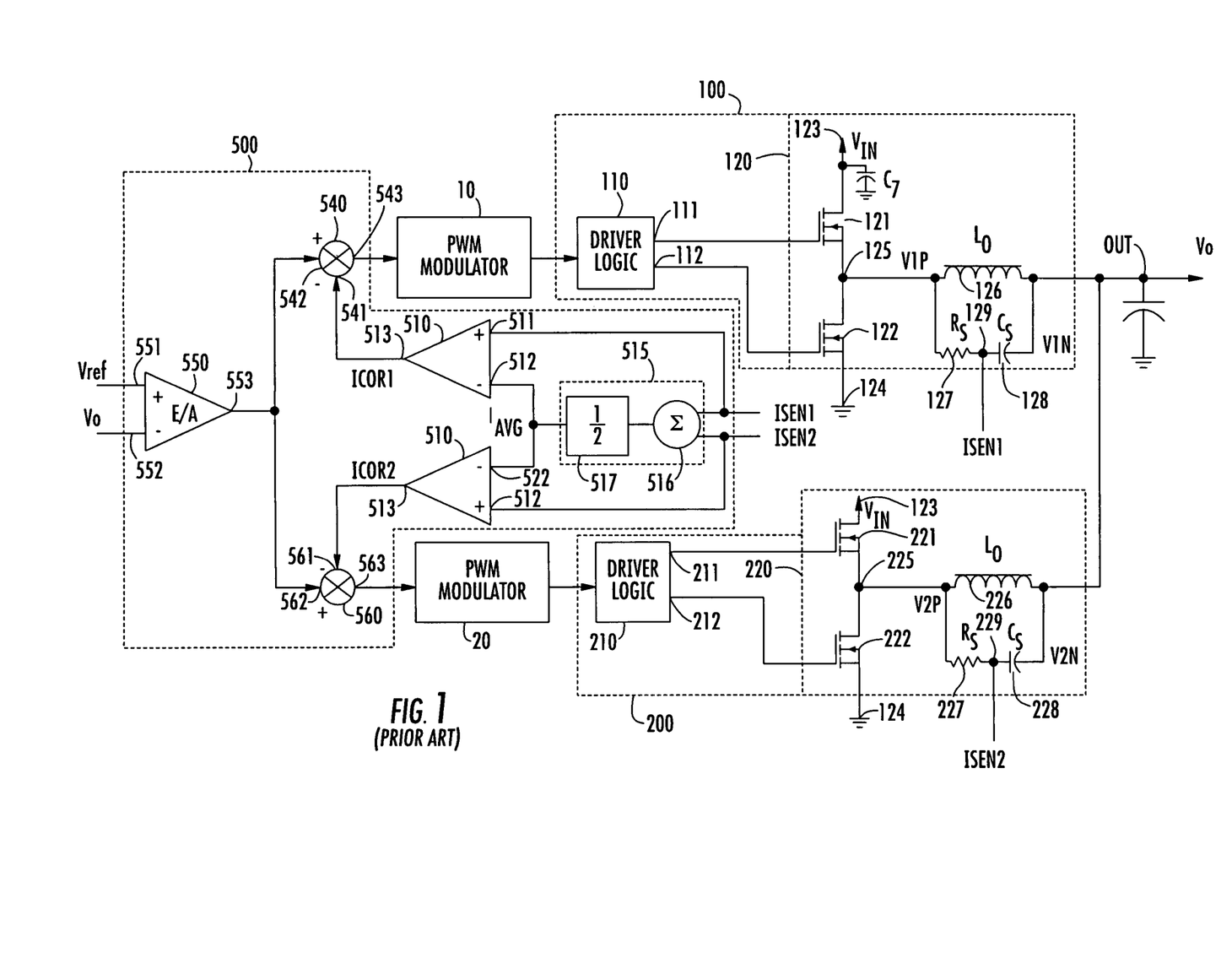
FIG. 1 diagrammatically illustrates the architecture of a conventional dual phase DC-DC converter employing single ended current sensing for current-sharing control of the power delivered by two power channels to a load.

A multi-phase DC-DC converter uses a supervisory multi-channel controller to regulate the power delivered by multiple phases or power channels of the converter to an output node feeding a load. As a non-limiting example, FIG. 1 diagrammatically illustrates a conventional dual-phase DC-DC converter, which contains two power channels 100 and 200, that drive an output node OUT with an output voltage Vo. The output voltage is regulated by a supervisory controller 500, which monitors output currents ISEN1 and ISEN2 sensed at current sensing ports coupled to phase nodes 125 and 225 of respective power switching stages 120 and 220 of the two channels, and uses this current information to precisely control the pulse widths of associated streams of pulse width modulation (PWM) waveforms applied by respective PWM generators 10 and 20 to drivers 110 and 210 that control switching times of switching devices (e.g., MOSFETs) of the output power switching stages 120 and 220. The PWM waveforms are sequenced and timed such that the interval between rising edges (or in some implementations, falling edges) thereof is constant, for the purpose of equalizing the currents delivered by the two power channels. (The sum of the current measurements may also be also used to precisely regulate the output resistance in a method commonly known as droop regulation or load-line regulation.)

More particularly, in the two-phase DC-DC converter architecture of FIG. 1, the first power switching stage 120 is shown as including an upper power semiconductor switch (e.g., MOSFET) 121, and a lower power semiconductor switch (e.g., MOSFET) 122 having the source-drain paths thereof coupled in series between an input voltage (Vin) supply terminal 123 and a reference voltage (ground) terminal 124. The control or gate input of the upper MOSFET switch 121 is coupled to a first output 111 of the first channel driver 110, while the control or gate input of lower MOSFET switch 122 is coupled to a second output 112 of the first channel driver. The common or phase node 125 between the upper and lower MOSFET switches 121 and 122 provides a voltage V1P, and is coupled by way of an output inductor (Lo) 126 to the output node OUT, to which a first phase/channel output voltage V1N from the first power channel is applied. An output current sense resistor 127 (having a resistor value Rs) is coupled between the phase node 125 and a current sense node 129 by way of which a measure ISEN1 of the output current of the first channel is derived for application to the controller 500. A capacitor (Cs) 128 is coupled between current sense node 129 and the output node OUT.

In a like manner, the second power switching stage 220 contains an upper power semiconductor switch (MOSFET) 221, and a lower power semiconductor switch (MOSFET) 222 having the source-drain paths thereof coupled in series between the input voltage (Vin) supply terminal 123 and the reference voltage (ground) terminal 124. The control or gate input of upper MOSFET switch 221 is coupled to a first output 211 of the second channel driver 210, while the control or gate input of lower MOSFET switch 222 is coupled to a second output 212 of the second channel driver. The common or phase node 225 between the upper and lower MOSFET switches 221 and 222, which provides a voltage V2P, is coupled by way of an output inductor (Lo) 226 to the output node OUT, to which a second phase/channel output voltage V2N from the second power channel is applied. An output current sense resistor 227 (having a resistor value Rs) is coupled between the phase node 225 and a current sense node 229 by way of which a measure ISEN2 of the output current of the second channel is derived for application to the controller 500. A capacitor (Cs) 228 is coupled between current sense node 229 and the output node OUT.

To control the operation of the first power channel 100, controller 500 includes a first difference amplifier 510, which has a first, non-inverting (+) input 511 coupled to the first channel's current sense node 129, so as to receive a measure of the first sensed current ISEN1, and a second, inverting input (−) 512 coupled to receive a voltage representative of the average I.sub.AVG of the first and second currents ISEN1 and ISEN2 as produced by an averaging circuit 515. Averaging circuit 515 includes a summing unit 516 coupled to the two current sensed nodes 129 and 229 from which the sensed currents ISEN1 and ISEN2 are supplied. The output of summing unit 516 is coupled to a divide-by-two divider 517, which outputs a voltage representative of the average current value I.sub.AVG of the two sense currents ISEN1 and ISEN2. The output 513 of difference amplifier 510 is used to provide a first correction voltage ICOR1 representative of the difference between the first channel's sensed current ISEN1 and the average I.sub.AVG of the two sensed currents.

For controlling the operation of the second power channel 200, controller 500 includes a second difference amplifier 520, which has a first, non-inverting (+) input 521 thereof coupled to the second channel's current sense node 229, so as to receive a measure of the second sensed current ISEN2, and a second, inverting input (−) 522 coupled to receive the voltage representative of the average output I.sub.AVG of averaging circuit 515. The output 523 of difference amplifier 520 is used to provide a second correction voltage ICOR2 representative of the difference between the second channel's sensed current ISEN2 and the average I.sub.AVG of the two sensed currents.

The first correction voltage ICOR1 is coupled to a first (−) input 541 of a subtraction unit 540, which has a second (+) input 542 coupled to receive an error voltage generated at the output 553 of an error amplifier 550. Error amplifier 550 generates an error voltage representative of the difference between a reference voltage Vref coupled to a first, non-inverting (+) input 551 thereof, and the output voltage Vo that is fed back from the output node OUT to a second, inverting (−) input 552 thereof, and couples this error voltage to second (+) inputs 542 and 562 of respective subtraction units 540 and 560. Subtraction unit 560 has a first (−) input 561 coupled to receive the second correction voltage ICOR2 at the output 523 of difference amplifier 520. The output 543 of subtraction unit 540 serves as the control input for the PWM modulator 10 of the first power channel 100, while the output 563 of subtraction unit 560 serves as the control input for the PWM modulator 20 of the second power channel 200.

In operation, any difference between the output voltage Vo sensed at the output terminal OUT and the reference voltage Vref produces an error voltage at the output of error amplifier 550. This error voltage constitutes a principal control metric for adjusting the PWM waveforms produced by PWM modulators 10 and 20 of the respective power channels/phases 100 and 200. Since it monitors the currents ISEN1 and ISEN2 sensed at the outputs of the two power channels 100 and 200, controller 500 is able to determine any imbalance in these currents for the two channels, by comparing each channel's sensed current with the average value $I_{AVG}$ of the sensed currents for both phases. Any difference between a sensed current for a respective channel i and the average $I_{AVG}$ of the sensed currents for the two channels results in a correction voltage ICORi that is used to offset or modify the error voltage produced by error amplifier 550, and thereby the pulse widths of the PWM waveforms generated by the PWM generators 10 and 20, so as to equalize the currents delivered by the two power channels.

Now although the output current monitoring and imbalance correction mechanism employed in the converter architecture of FIG. 1 is intended to effectively equalize the currents delivered by the two power channels, it can do so provided that the circuitry layouts of the respective power channels of the converter are symmetric with respect to one another. Otherwise—namely, in the case of a non-symmetric circuit layout—the output voltage V1N for the first channel/phase will not equal the output voltage V2N for the second channel/phase, resulting in a current imbalance between the different channels, and preventing the controller from equalizing the currents in the two power channels.

This lack of symmetry in the power channel circuit layouts of a multi-phase DC-DC converter—which is not uncommon as the number of power channels increases, and can be expected to be the case where the converter employs an odd number of channels/phases—is due principally to the fact that the distances from the controller to the most remote power channels increase substantially as the number of phases/channels increases. This makes it very difficult for the designer to preserve signal integrity of the current-sense lines, due to the fact that these lines typically traverse long distances through a noisy environment from the output current monitoring nodes and the controller, and the fact that the signals transmitted on the current-sense lines are voltage signals proportional to current, and voltage signals are prone to corruption from capacitively-coupled noise.

SUMMARY OF THE INVENTION

The above-mentioned problems of current systems are addressed by embodiments of the present invention and will be understood by reading and studying the following specification. The following summary is made by way of example and not by way of limitation. It is merely provided to aid the reader in understanding some of the aspects of the invention.

In one embodiment, a DC-DC voltage converter is provided. The converter includes a plurality of power channels and a controller. Each power channel is configured to provide a voltage output to an output node of the converter. Each power channel also includes a first sensing circuit configured to provide a primary feedback signal indicative of an output current of the power channel. Each power channel further includes an auxiliary sensing circuit to provided one or more auxiliary feedback signals indicative of an output current of each of the respective other power channels. The controller is configured to control each of the power channels based at least in part on the primary feedback signal and the one or more auxiliary feedback signals.

DETAILED DESCRIPTION

Before describing the new and improved multi-phase DC-DC converter architecture in accordance with the present invention, it should be observed that the invention resides primarily in a modular arrangement of conventional power supply circuits and electronic signal processing circuits and components therefor. In a practical implementation that facilitates packaging in a hardware-efficient equipment configuration, these modular arrangements may be readily implemented as field programmable gate array (FPGA)-, or application specific integrated circuit (ASIC)-based chip sets. Consequently, the configuration of such an arrangement of circuits and components and the manner in which they are interfaced with one another have, for the most part, been illustrated in the drawings by readily understandable block diagrams, which show only those specific details that are pertinent to the present invention, so as not to obscure the disclosure with details which will be readily apparent to those skilled in the art having the benefit of the description herein. The block diagram illustrations within the various Figures are primarily intended to show the major components of a DC-DC converter according to the invention in a convenient functional grouping, whereby the present invention may be more readily understood.

Figure 2:
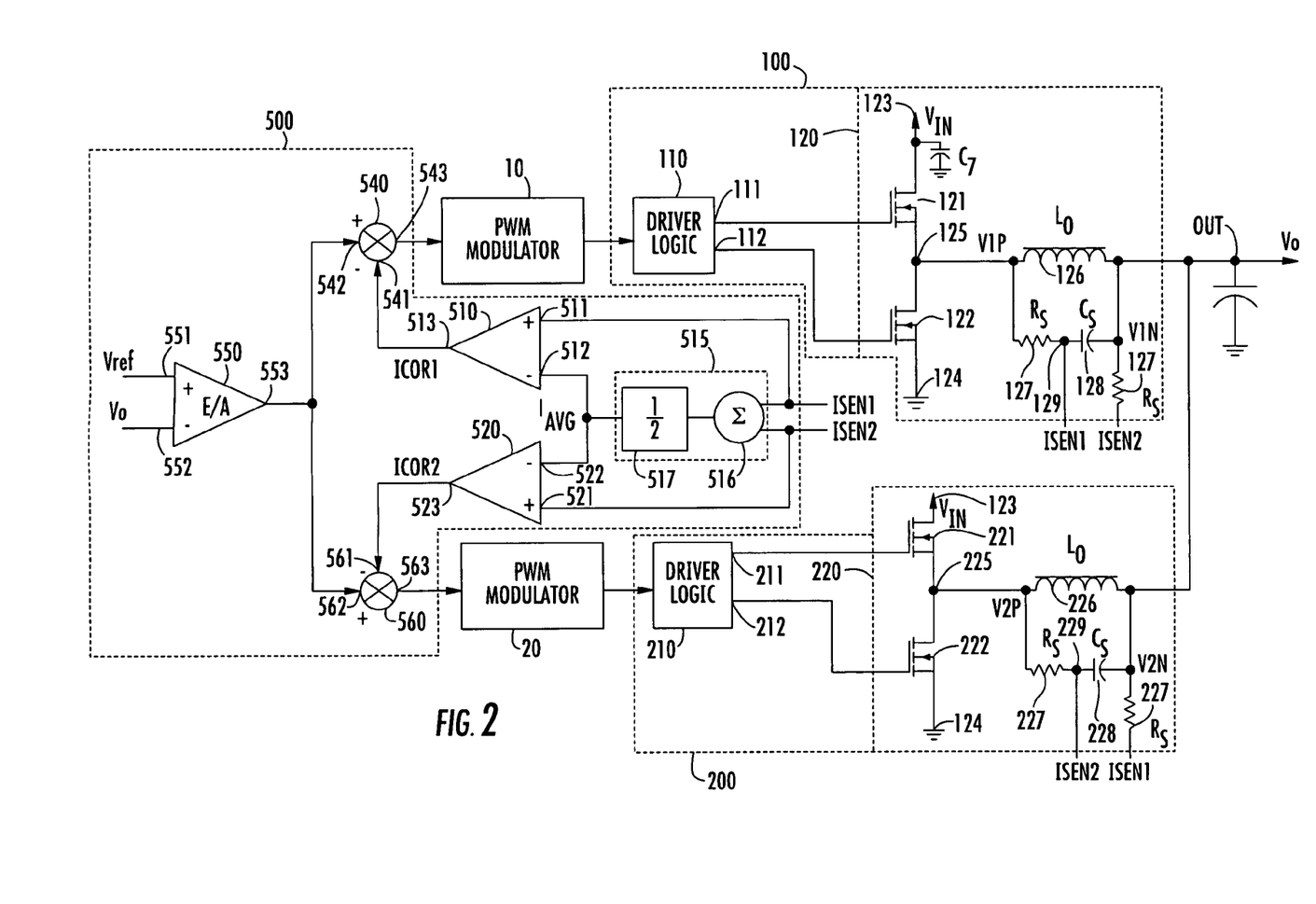
FIG. 2 diagrammatically illustrates the architecture of a dual-phase DC-DC converter employing single ended current sensing for current-sharing control in accordance with the invention, which incorporates auxiliary resistor networks to couple secondary current sense ports of both power channels/phases to the converter's supervisory controller.

Attention is now directed to FIG. 2, which is a block diagram of a two-channel or dual-phase DC-DC converter that incorporates auxiliary resistor networks to feed back secondary sensed currents derived from the output nodes of each channel to the differential measurement and control circuitry of the converter's supervisory controller. It should be noted that the invention is not limited to this or any particular number of power channels/phases; a two phase/channel architecture has been illustrated to reduce the complexity of the drawings. The invention is also applicable to multi-phase converter architectures that include three or more phases, as will be described.

As can be seen from a comparison of the dual-phase DC-DC converter architecture of FIG. 2 with that of FIG. 1, the architecture of FIG. 2 for the most part corresponds to the converter architecture shown in FIG. 1, but additionally includes an augmentation thereof, in that a first auxiliary (secondary) current sense coupling resistor 127', associated with the current ISEN2 sensed in the second phase/channel 200, has been incorporated into the current sense network circuitry of the first phase/channel 100, and a second auxiliary (secondary) current sense coupling resistor 227' associated with the primary current ISEN1 sensed in the first phase/channel 100, has been incorporated into the current sense network circuitry of the second phase/channel 200. The values (Rs) of the auxiliary current sense-coupling resistors 127' and 227' are the same as those (Rs) of resistors 127 and 227. The architectures of the DC-DC converters of the two Figures are otherwise the same. As such, for purposes of conciseness, a description of the like portions of the two Figures will not be repeated here. Instead, attention may be directed to the above description of FIG. 1 for a description of its like components in FIG. 2.

In the dual-phase DC-DC converter architecture of FIG. 2, a first end of the auxiliary current sense resistor 127' of the first power channel 100 is coupled to the V1N voltage output of the first power stage 120 delivered to the output node OUT, while a second end thereof is coupled to the ISEN2 input of the controller 500, to which the ISEN2 current sense port/node 229 of the second power channel 200 is coupled. Since the value Rs of the auxiliary current sense resistor 127' is the same as that (Rs) of current sense resistor 227, the current ISEN2 applied to the controller's input port ISEN2 will be defined in accordance with an average of a primary sensed current based upon the voltage V2P to which the resistor 227 is coupled, and a secondary sensed current based upon the voltage V1N to which the resistor 127' is coupled. In the present example of a two channel converter, this average is proportional to one-half the sum of the respective voltages V2P and V1N; namely, ISEN2=0.5*(V2P+V1N)/Rs.

In a complementary manner, a first end of the auxiliary current sense resistor 227' of the second power channel 200 is coupled to the V2N voltage output of the first power stage 220 delivered to the output node OUT, while a second end thereof is coupled to the ISEN1 input of the controller 500, to which the ISEN1 current sense port/node 129 of the first power channel 100 is coupled. As in the case of the first power channel, since the value Rs of the auxiliary current sense resistor 227' is the same as that (Rs) of current sense resistor 127, the current ISEN1 applied to the controller's input port ISEN1 will be defined in accordance with an average of a primary sensed current based upon the voltage V1P to which resistor 127 is coupled, and a secondary sensed current based upon the voltage V2N to which resistor 227' is coupled. In the present example of a two channel converter, this average is proportional to one-half the sum of the respective voltages V2P and V1N; namely, ISEN2=0.5*(V2P+V1N)/Rs.

From inspection, it can be seen that (V1P−V1N)=(V2P−V2N), so that the feed back connections from the auxiliary current sense resistors 127' and 227' effectively provides a differential sensing effect for the controller 500, without having to employ a differential amplifier per channel that entails more complexity and cost. Thus, through the addition of relatively simple auxiliary circuitry (resistor network), the present invention ensures that the converter's supervisory controller is able to independently control the pulse widths of the PWM waveforms for the two different phases/channels 100 and 200 in a manner that effectively balances the outputs currents delivered by the two power channels. Whether or not there is symmetry between the integrated circuit layouts of the two phases of the converter is immaterial.

Figure 3:
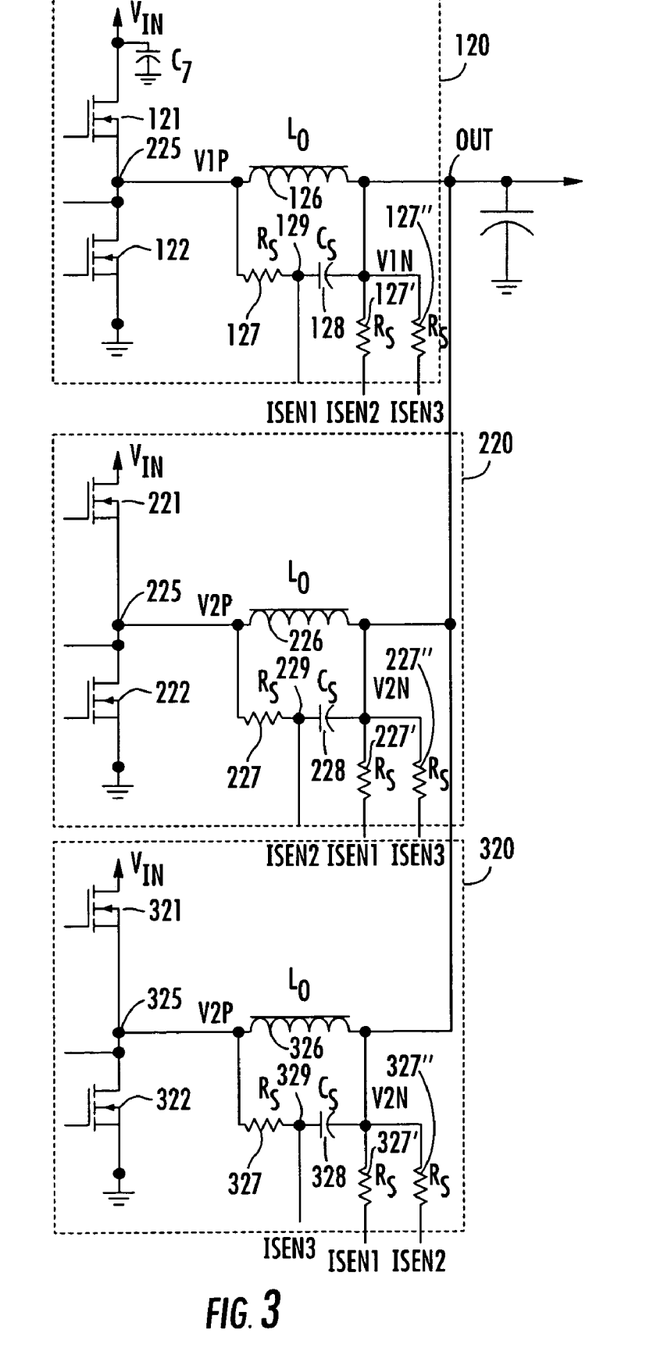
FIGS. 3 and 4 diagrammatically illustrate the architecture of a three-channel/phase DC-DC converter employing single ended current sensing for current-sharing control in accordance with the invention, which incorporates auxiliary resistor networks to couple multiple secondary current sense ports of each of the power channels/phases to the differential measurement and control circuitry of the supervisory controller.
Figure 4:
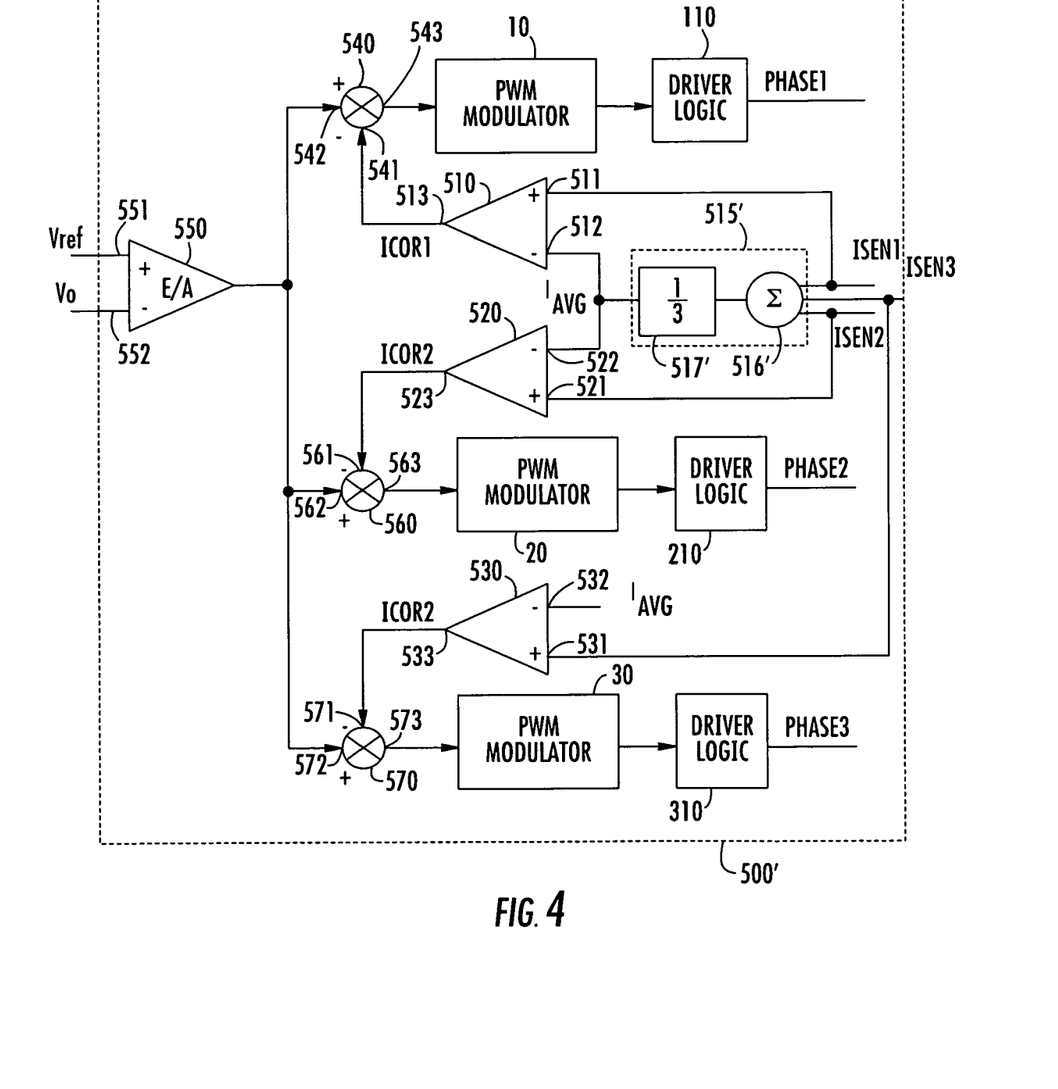

As described briefly above, the present invention can be extended beyond the two-phase example of FIG. 2 to three or more phases. For example, FIGS. 3 and 4 diagrammatically illustrate the manner in which the auxiliary current sense resistor networks of the two-phase converter architecture of FIG. 2 may be modified to achieve circuit layout-independent current balancing for a three-phase DC-DC converter. In particular, FIG. 3 shows respective power stages 120, 220 and 320 of power channels 100, 200 and 300 of a three-phase converter, which are respectively driven by first, second and third channel driver ICs 110, 210 and 310 of a controller/driver IC diagrammatically illustrated in broken lines 500' in FIG. 4.

Like the two-phase DC-DC converters of FIGS. 1 and 2, each of the power stages 120, 220 and 320 of the three-phase converter of FIG. 3 contains an upper power semiconductor switch (e.g., MOSFET) and a lower power semiconductor switch (e.g., MOSFET) having the source-drain paths thereof coupled in series between an input voltage (Vin) supply terminal and a reference voltage (ground) terminal. The control or gate input of the upper MOSFET switch is coupled to a first output of an associated driver for that stage, while the control or gate input of the lower MOSFET switch is coupled to a second output of the driver for that stage. Common or phase nodes 125, 225 and 325 between the upper and lower MOSFET switches of the respective power stages, at which voltages V1P, V2P and V3P are provided, are coupled to respective output inductors (Lo) 126, 226 and 326, which supply respective phase/channel output voltages V1N, V2N and V3N to the converter's output node OUT.

As in the two-phase embodiment of FIG. 2, the V1P output of the first power stage 120 is coupled through a resistor (Rs) 127 to a primary sense current ISEN1 port or node 129, which is further coupled through a capacitor 128 to the output node OUT. Similarly, the V2P output of the second power stage 220 is coupled through a resistor (Rs) 227 to a primary sensed current ISEN2 port or node 229, which is further coupled through a capacitor 228 to the output node OUT, while the V3P output of the third power stage 320 is coupled through a resistor (Rs) 327 to a primary sense current ISEN3 port or node 329, which is further coupled through a capacitor 328 to the output node OUT. The first, second and third primary sense current ports 129, 229 and 329 are coupled to ISEN1, ISEN2 and ISEN3 input ports of the controller/driver IC 500' of FIG. 4. In addition, each of the power channels of the three-phase embodiment of FIGS. 3 and 4 further includes a pair of secondary sense current coupling resistors, respective ones of which are associated with the primary currents sensed in the other two phases, coupled between the output node of that power channel and the current sense input ports of the controller/driver IC 500' for the other two phases.

In particular, the first power channel 100 includes first and second secondary sense current coupling resistors 127' and 127", first ends of which are connected to the V1N voltage output of the first power stage 120, while second ends thereof are coupled to the ISEN2 port and the ISEN3 input, respectively, of the controller 500', to which the primary sense current ISEN2 port/node 229 of the second power channel 200 and the primary sense current ISEN3 port/node 329 of the third power channel 300 are coupled. The value Rs of each of the auxiliary current sense resistors 127' and 127" is the same as that (Rs) of current sense resistors 227 and 327.

Similarly, the second power channel 200 includes first and second secondary sense current coupling resistors 227' and 227", first ends of which are connected to the V2N voltage output of the second power stage 220, while second ends thereof are coupled to the ISEN1 port and the ISEN3 input, respectively, of the controller 500', to which the primary sense current ISEN1 port/node 129 of the first power channel 100 and the primary sense current ISEN3 port/node 329 of the third power channel 300 are coupled. The value Rs of each of the auxiliary current sense resistors 227' and 227" is the same as that (Rs) of current sense resistors 127 and 327.

Also, the third power channel 300 includes first and second secondary sense current coupling resistors 327' and 327", first ends of which are connected to the V3N voltage output of the third power stage 320, while second ends thereof are coupled to the ISEN1 port and the ISEN2 input, respectively, of the controller 500', to which the primary sense current ISEN1 port/node 129 of the first power channel 100 and the primary sense current ISEN2 port/node 229 of the second power channel 200 are coupled. The value Rs of each of the auxiliary current sense resistors 327' and 327" is the same as that (Rs) of current sense resistors 127 and 227.

As in the case of the dual-phase DC-DC converter architecture of FIG. 2, since each of the secondary sense current coupling resistors has the same value of resistance Rs as the primary sense current coupling resistors, the values of the combined sense currents that are fed back to the controller's three input ports ISEN1, ISEN2 and ISEN3 will be defined in accordance with an average of the respective voltages to which the sense current coupling resistors for each sensed current are coupled, which, in the present example of a three-channel converter, corresponds to one-third of the sum of the respective voltages. Namely ISEN1=0.33*(V1P+V2N+V3N); ISEN2=0.33*(V2P+V1N+V3N); and ISEN3=0.33*(V3P+V1N+V2N).

For controlling the respective power channels 100 and 200 of the three-phase converter of FIGS. 3 and 4, controller 500' includes first and second difference amplifiers 510 and 520 that are connected in the same manner as in the dual-phase architecture of FIG. 2. The first, non-inverting (+) input 511 of difference amplifier 510 is coupled to each of the resistors 127, 227' and 327' associated with the sensed current ISEN1, while the first, non-inverting (+) input 521 of difference amplifier 520 is coupled to each of the resistors 127', 227 and 327" associated with the sensed current ISEN2. The second, inverting (−) inputs 512 and 522 of difference amplifiers 510 and 520, respectively, are coupled to the output I.sub.AVG of a divide-by-three divider 517' of an averaging circuit 515'. This average corresponds to one-third of the summation of the sensed currents ISEN1, ISEN2 and ISEN3 that are fed back to a summation circuit 516' from the three current sense resistors of each power stage, described above. The output 513 of difference amplifier 510 provides a first correction voltage ICOR1 representative of the difference between the first channel's sensed current ISEN1 and the average I.sub.AVG of the three sensed currents (ISEN1, ISEN2 and ISEN3), while the output 523 of difference amplifier 520 provides a second correction voltage ICOR2 representative of the difference between the second channel's sensed current ISEN2 and the average I.sub.AVG of the three sensed currents. To control the third power channel 300, controller 500' includes a third difference amplifiers 530 having a first, non-inverting (+) input 531 coupled to each of the resistors 127", 227" and 327 associated with the sensed current ISEN3, while the second, inverting (−) input 532 of difference amplifier 530 is coupled to the output I.sub.AVG of the divide-by-three divider 517' of averaging circuit 515'. The output 533 of difference amplifier 530 provides a third correction voltage ICOR3 representative of the difference between the third channel's sensed current ISEN3 and the average I.sub.AVG of the three sensed currents (ISEN1, ISEN2 and ISEN3).

As in the dual-phase architecture of FIG. 2, the first correction voltage ICOR1 is coupled to a first (−) input 541 of subtraction unit 540, while the second correction voltage ICOR2 is coupled to a first (−) input 561 of subtraction unit 560. The third correction voltage ICOR3 is coupled to a first (−) input 571 of a subtraction unit 570. The subtraction units 540, 560 and 570 have second (+) inputs 542, 562 and 572, respectively, that are coupled to receive the error voltage generated at the output 553 of error amplifier 550. The output 543 of subtraction unit 540 serves as the control input for PWM modulator 10 of the first power channel 100, the output 563 of subtraction unit 560 serves as the control input for PWM modulator 20 of the second power channel 200, and the output 573 of subtraction unit 570 serves as the control input for PWM modulator 30 of the third power channel 300.

Similar to the dual-phase architecture of FIG. 2, for the three-phase embodiment of FIGS. 3 and 4, it can be seen that (V1P−V1N)=(V2P−V2N)=(V3P−V3N), so that the feedback connections from the additional pair of secondary sense current coupling 127' and 127" in the first channel, the additional pair of secondary sense current coupling resistors 227' and 227" in the second channel, and the additional pair of secondary sense current coupling resistors 327' and 327" in the third channel effectively provide differential sensing for the controller 500, without the need for costly differential amplifiers. Such differential sensing enables the controller to balance the currents delivered by the three power channels, even though the circuit layouts of the three phases of the integrated circuit layout of the converter are not symmetric.

In addition to reducing cost and complexity by eliminating the need for differential amplifiers, the number of sense nodes (e.g., ISEN1, ISEN2, ISEN3, Vo) is also reduced in accordance with the invention, as compared with conventional differential schemes, which require a larger number of sense nodes (e.g., ISEN1P, ISEN1N, ISEN2P, ISEN2N, ISEN3P, ISEN3N). It may also be noted that the resistor networks may be implemented exterior to, or integrated within, the IC controller. In either implementation, there will be a number of pins saving benefit, in addition to a reduced complexity benefit, as far as the IC is concerned.

Figure 5:
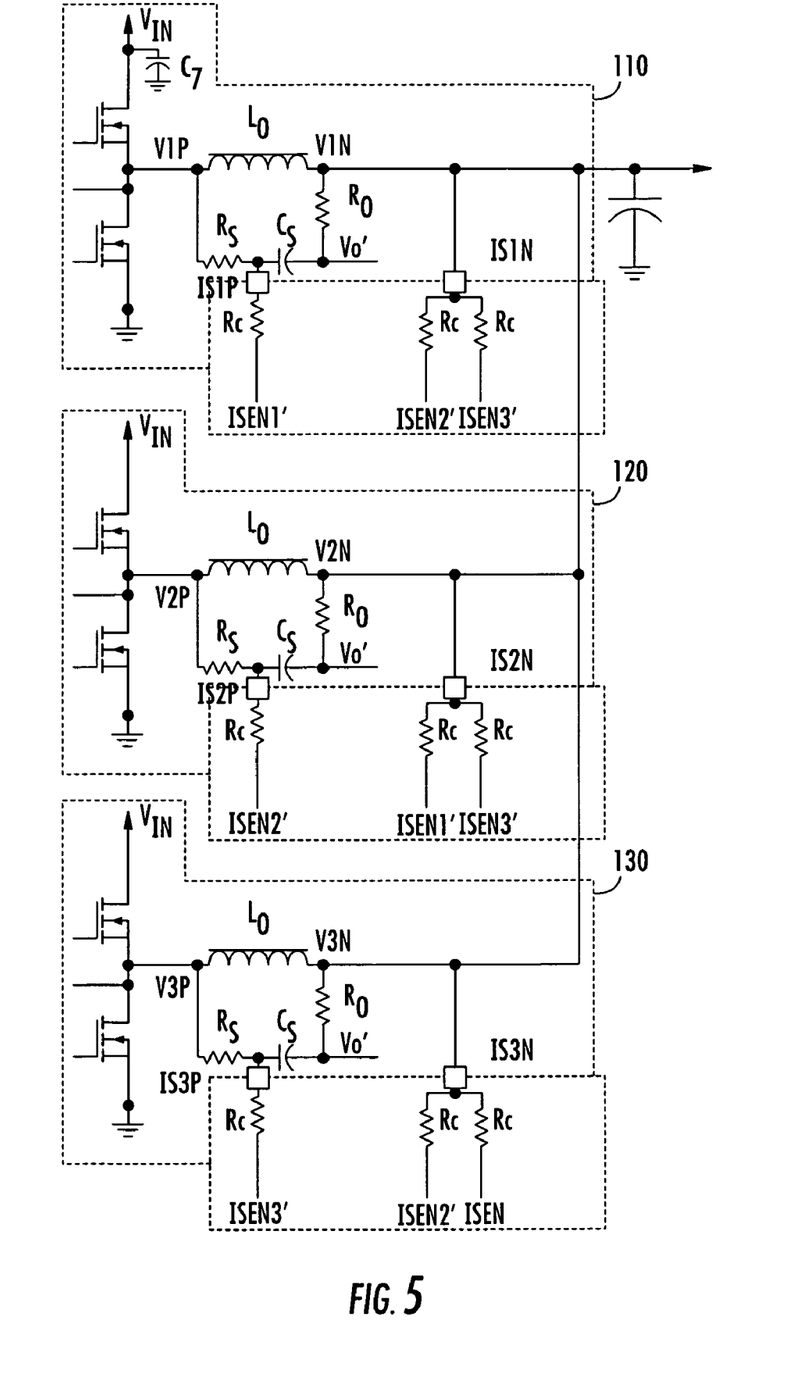
FIG. 5 diagrammatically illustrates an alternative integrated circuit implementation of the primary and auxiliary current sense resistors networks that are employed to couple monitored currents at the outputs of the respective power stages of the power channels of the three-phase converter of FIGS. 3 and 4 to the supervisory controller therefor.

FIG. 5 diagrammatically illustrates an alternative implementation of the primary and auxiliary current sense resistor networks that are employed to couple output voltage nodes of the respective power stages of the power channels of the three-phase converter of FIGS. 3 and 4 to the controller therefor. In accordance with this alternative implementation, each power channel includes a multi-resistor, resistor-capacitor network, that is connected across the power stage's output inductor Lo. As shown in FIG. 5, the multi-resistor network for a respective ith power stage is comprised of a first resistor Rs, one end of which is connected to the common/phase node at which output voltage ViP for that ith stage is produced, and the other end of which is connected to a capacitor Cs. The capacitor Cs is further coupled to a first end of a second resistor Ro, a second end of which is connected to the output node ViN for that stage. The common node ISIP between the second resistor Rs and the capacitor Cs is coupled through a third, primary current sense resistor Rc to a primary current sense port ISENi' for that ith power stage, while the common node Vo' between the capacitor Cs and the resistor Rc serves as the output voltage-monitoring input to the error amplifier. Fourth and fifth (current sense) resistors Rc are coupled between the output node ViN and respective auxiliary current sense ports ISENj' and ISENk'. The letters i, j and k correspond to one of the first (1), second (2) and third (3) sensed output currents. The three current sense ports ISEN1', ISEN2' and ISEN3' for each power channel are coupled to associated inputs ISEN1', ISEN2' and ISEN3' of the controller, as in the implementation of FIGS. 3 and 4, so that, as in that implementation, the values of the sensed output currents fed back to the controller's three input ports ISEN1', ISEN2' and ISEN3' will be defined in accordance with the average of the currents sensed by the current sense resistors Rc for each sensed current, whereby ISENI1'=0.33*(V1P+V2N+V3N); ISEN2'=0.33*(V2P+V1N+V3N); and ISEN3' 0.33*(V3P+V1N+V2N).

Figure 6:
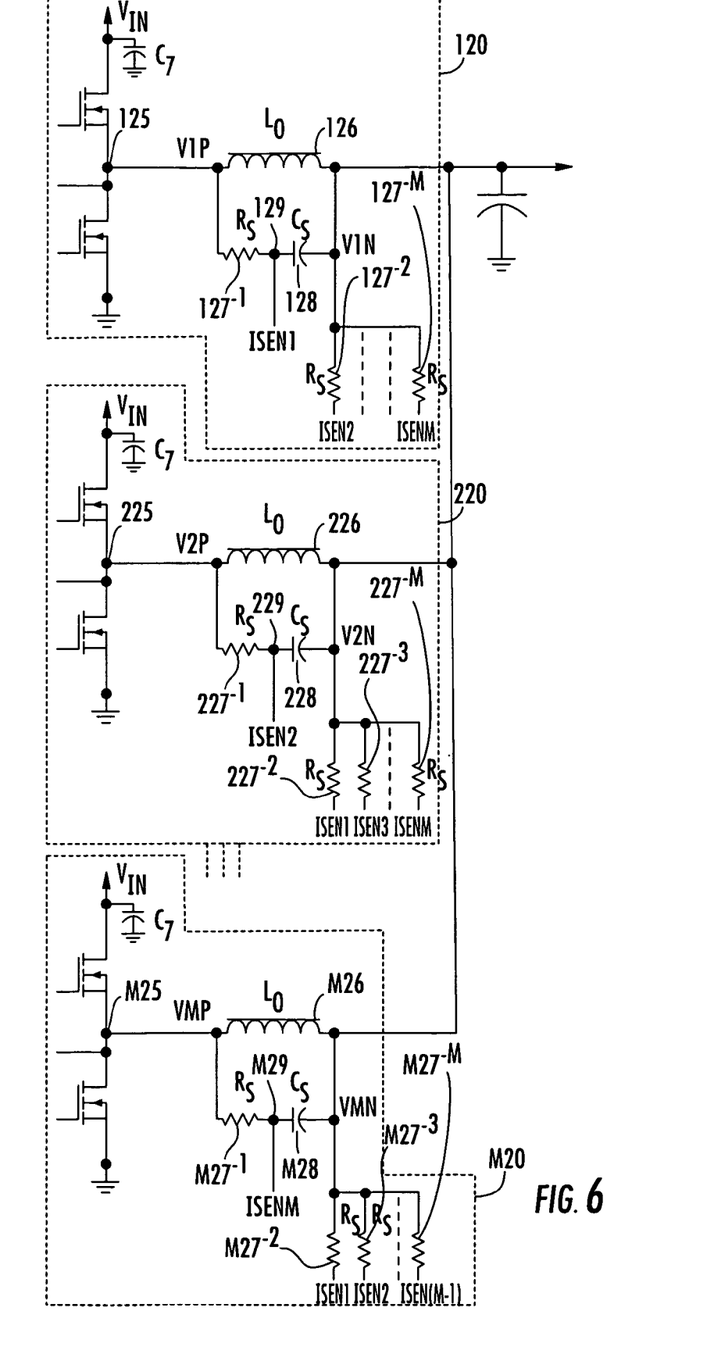
FIG. 6 diagrammatically illustrates the architecture of an M-phase DC-DC converter employing single ended current sensing for current-sharing control in accordance with the invention, which incorporates auxiliary resistor networks to couple secondary current sense ports of all power channels/phases to the converter's supervisory controller.

FIG. 6 diagrammatically illustrates the manner in which the auxiliary current sense resistor networks of the multi-phase DC-DC converter architecture described above with reference to FIGS. 2-4 may achieve circuit layout-independent current balancing for the general case of an M-phase DC-DC converter. In particular, FIG. 6 shows respective power stages 120, 220, . . . , M20 of plurality M of power channels of an M-phase converter, which are respectively driven by first, second, . . . , Mth channel drivers of an associated M-phase controller/driver (not shown in FIG. 6, but effectively corresponding to that of FIGS. 2-4, and coupled to M2 current sense resistors of the M output stages, as will be described).

Like the multi-phase DC-DC converters of FIGS. 2-4, each of the power stages of the M-phase converter of FIG. 6 contains an upper power semiconductor switch (e.g., MOSFET) and a lower power semiconductor switch (e.g., MOSFET) having the source-drain paths thereof coupled in series between an input voltage (Vin) supply terminal and a reference voltage (ground) terminal. The control or gate input of the upper MOSFET switch is coupled to a first output of an associated driver for that stage, while the control or gate input of the lower MOSFET switch is coupled to a second output of the driver for that stage.

The common/phase nodes 125, 225, . . . , M25 between the upper and lower MOSFET switches of the respective power stages, at which voltages V1P, V2P, . . . , VMP are provided, are coupled to respective output inductors (Lo) 126, 226, . . . , M26, which supply respective phase/channel output voltages V1N, V2N, . . . , VMN to the converter's output node OUT. The V1P output of the first power stage 120 is coupled through a resistor (Rs) 127-1 to an ISEN1 port or node 129, which is further coupled through a capacitor 128 to the output node OUT. The V2P output of the second power stage 220 is coupled through a resistor (Rs) 227-1 to an ISEN2 port or node 229, which is further coupled through a capacitor 228 to the output node OUT, while the VMP output of the Mth power stage M20 is coupled through a resistor (Rs) M27-1 to an ISENM port or node M29, which is further coupled through a capacitor M28 to the voltage output node OUT. The first through Mth current sense ports 129, 229, M29 are coupled to ISEN1, ISEN2, . . . , ISENM inputs of the converter's controller/driver.

In addition, each power channel of the M-phase converter architecture of FIG. 6 further includes a plurality of M–1 auxiliary current sense coupling resistors, coupled to sense secondary currents associated with the primary currents sensed in the other M–1 phases. The (M–1) auxiliary current sense resistors of a respective ith power channel are coupled between the output node of that ith power channel at which a respective output voltage ViN is provided, and the current sense input ports of the controller/driver for the other M–1 phases. Thus, the M-phase architecture of FIG. 6 includes a total of M primary current sense resistors 127-1-M27-1, each having the value Rs and being respectively coupled to M phase nodes at which voltages V1P–VMP are provided, and an additional M*(M–1) secondary current sense resistors 127-2-127-M, . . . , M27-1-M27-M, each having the same value Rs, and being coupled to M output nodes at which voltages V1N–VMN are provided.

Namely, the first power channel includes M–1 auxiliary resistors 127-2-127-M, first ends of which are connected to the V1N voltage output of the first power stage 120, while second ends thereof are coupled to the ISEN2 through ISENM inputs, respectively, of the controller. Similarly, the second power channel includes M auxiliary current sense resistors 227-2-227-M, first ends of which are connected to the V2N voltage output of the second power stage 220, while second ends thereof are coupled to the ISEN1 input and to the ISEN3-ISENM inputs, respectively, of the controller. Also, the Mth power channel includes M auxiliary resistors M27-2-M27-M, first ends of which are connected to the VMN voltage output of the Mth power stage M20, while second ends thereof are coupled to the ISEN1-ISEN(M–1) inputs, respectively, of the controller.

Again, since each of the secondary current sense resistors has the same value of resistance Rs as the primary current sense resistors, the values of the sensed output currents fed back to the controller's M input ports ISEN1-ISENM will be defined in accordance with an average of the respective voltages to which the current sense resistors for each sensed current are coupled. For the present example of an M-channel converter, this corresponds to one-Mth of the sum of the respective voltages. Namely ISEN1=(1/M)*(V1P+V2N+ . . . +VMN); ISEN2=(1/M)*(V2P+V1N+V3N+ . . . +VMN); and ISENM=(1/M)*(VMP+V1N+ . . . +V(M–1)N).

For controlling the respective power channels of the M-phase converter, the controller IC includes M difference amplifiers that are connected in the same manner as in the two-phase and three-phase embodiments of FIGS. 2-4, except that the I.sub.AVG reference for the M difference amplifiers is produced by the output of a divide-by-M divider within an averaging circuit, the front end of which sums the M primary sensed currents sensed by the M primary sensed current coupling resistors with the M*(M–1) secondary sensed currents ISEN1-ISENM that are fed back from the M*(M–1) auxiliary, secondary current sense resistors of each power stage, described above. The outputs of the M difference amplifiers provide M correction voltages ICOR1-ICORM, that are respectively representative of differences between the composite values of the M sensed currents ISEN1-ISENM and the average I.sub.AVG of the composite values of the M sensed currents. Similar to the above embodiments, these M correction voltages ICOR1-ICORM are coupled to first inputs of respective ones of M subtraction units, second inputs of which are coupled to receive the error voltage generated at the output of the error amplifier. The outputs of these subtraction units serve as control inputs for respective PWM modulators of the M power channels. Similar to the two-phase and three-phase embodiments, described above, in the M-phase embodiment (VIP–V1N)=(V2P–V2N)=(VMP–VMN).

As will be appreciated from the foregoing description, the above-described asymmetry circuitry layout-based current imbalance problem encountered in a multi-phase DC-DC converter is effectively obviated in accordance with the multi-phase DC-DC converter architecture of the present invention, which uses reduced complexity implementation-based, resistor-coupling to feed back values of sensed currents at secondary current sense ports that couple the output nodes for each phase to differential measurement and control circuitry within the converter's supervisory controller. This enables the controller to perform current-balanced control of pulse widths of the switching waveforms produced by the PWM modulators for all channels, whether or not there is symmetry among the integrated circuit layouts of those channels.

While we have shown and described several embodiments in accordance with the present invention, it is to be understood that the same is not limited thereto but is susceptible to numerous changes and modifications as known to a person skilled in the art, and we therefore do not wish to be limited to the details shown and described herein, but intend to cover all such changes and modifications as are obvious to one of ordinary skill in the art.

What is claimed:

1. A method of operating a multi-channel DC-to-DC converter, the method comprising:

determining a primary output current for each channel in the converter;

for each channel further determining a secondary sensed current for each of the other different channels in the converter; and using the determined primary output and the secondary sensed currents to control switching elements in channels of the converter, wherein balanced control of all of the channels in the multi-channel DC-to-DC converter is achieved.

2. The method of claim 1, wherein using the determined primary output and the secondary sensed currents to control switching elements in channels of the converter, further comprises:

averaging the primary output and the secondary sensed currents;

determining a difference between the determined average and the primary output current;

subtracting the determined difference from a determined error voltage; and using an outcome of the subtraction to control the switching elements.

3. The method of claim 2, further comprises:

determining the error voltage by comparing an output voltage of the converter to a reference voltage.

4. The method of claim 2, wherein using an outcome of the subtraction to control the switching elements further comprises:

controlling a modulator with a signal based on the subtraction; and controlling a driver that controls the switching elements with an output of the modulator.

5. The method of claim 2, wherein using an outcome of the subtraction to control the switching elements further comprises:

modulating an output signal based on the subtraction; and driving driver logic that controls the switching elements with the modulated output signal.

6. The method of claim 1, wherein determining the primary output current for each channel in the converter further comprises:

sensing a current on a common node of a primary resistor and a capacitor that are coupled across an inductor of the channel.

7. The method of claim 6, wherein for each channel further determining a secondary sensed current for each of the other different channels in the converter further comprises:

sensing a current through an auxiliary resistor coupled to an output node of the converter, the auxiliary resistor the having the same value as the primary resistor.

* * * * *